UNITED STATES PATENT OFFICE.

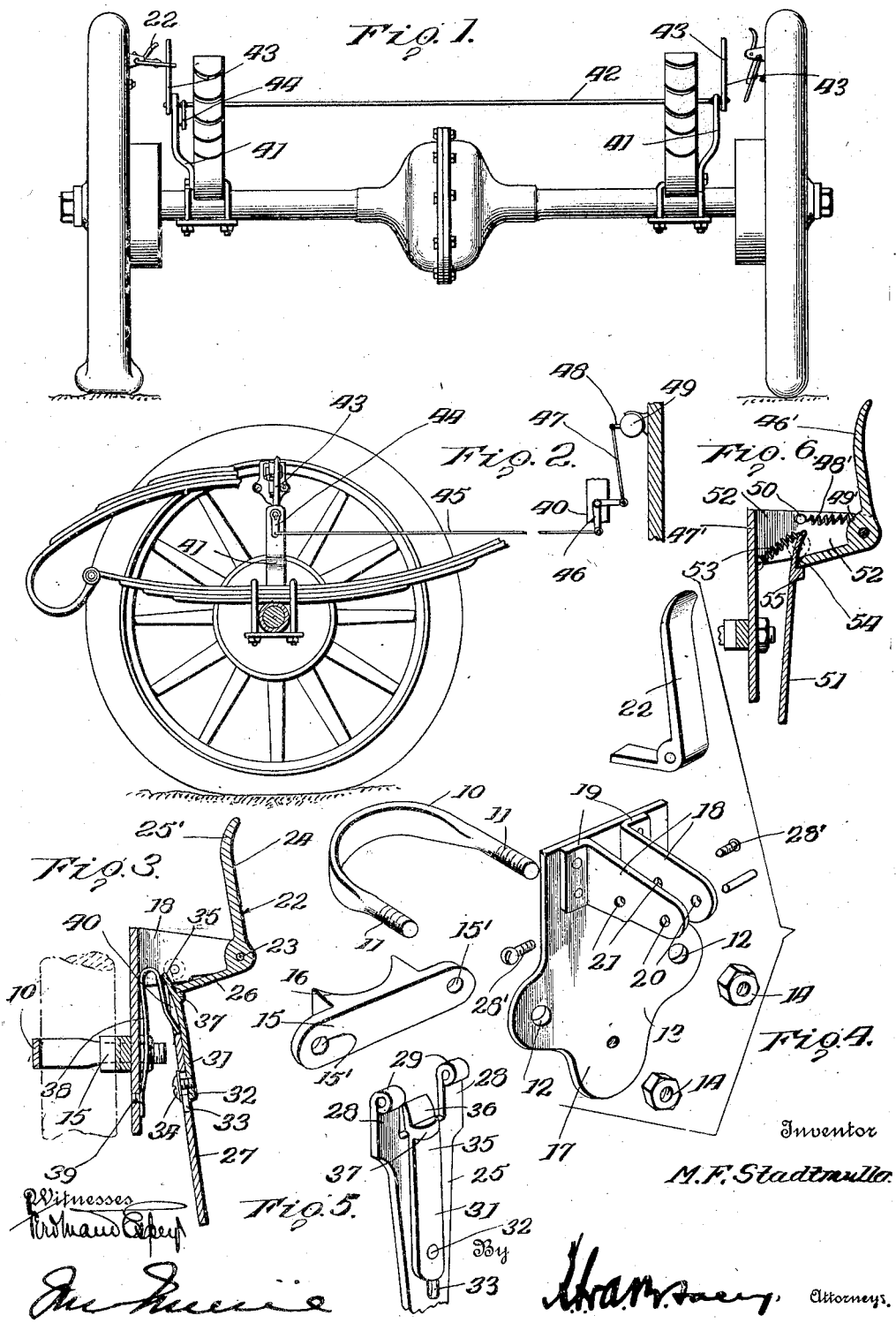

MAX F. STADTMULLER, OF FORT DODGE, IOWA.

ALARM MECHANISM FOR PNEUMATIC-TIRED WHEELS.

1,093,739.   Specification of Letters Patent.   Patented Apr. 21, 1914.

Application filed October 7, 1912. Serial No. 724,404.

*To all whom it may concern:*

Be it known that I, MAX F. STADTMULLER, citizen of the United States, residing at Fort Dodge, in the county of Webster and State of Iowa, have invented certain new and useful Improvements in Alarm Mechanism for Pneumatic-Tired Wheels, of which the following is a specification.

This invention relates to an improvement in attachments for pneumatic tired wheels which when the tire has become deflated operates a signal on the vehicle to which the wheel is attached.

The primary object of the invention is to provide a construction which may be carried by the wheel and which will be acted upon by a deflated tire to sound an alarm.

A further object of the invention is to provide a construction in which the tire when deflated will instantly operate the alarm and which may be readily reset after the tire has been inflated.

A further object of the invention is to provide means carried by the wheels of a vehicle which will when a tire is deflated operate means supported on the car to sound an alarm disposed on the dash board or at any point convenient to the operator, an alarm actuating mechanism which is carried by one wheel acting independently of the alarm actuating mechanisms on the other wheels.

In the drawings: Figure 1 is a rear elevation illustrating a portion of a pneumatic tired vehicle, one of the tires being shown as deflated, the tripping mechanism of the wheel on which said tire is positioned being shown in position to actuate the alarm; Fig. 2 is a diagrammatical view showing the arrangement of the alarm sounding mechanism; Fig. 3 is a vertical section taken through the trip mechanism; Fig. 4 is a disassembled perspective of the trip mechanism, the trip being omitted; Fig. 5 is a detail view of the hingedly supported terminal of the trip; Fig. 6 is a view showing a modified form of trip actuating mechanism.

In the drawings 10 designates a bail or yoke which is disposed to embrace the spoke of a pneumatic tired wheel, said bail being formed with the threaded terminals 11 which extend through the apertures 12 in the plate 13, nuts 14 being threaded on the terminals 11 to hold the bail and plate in contact with the spoke. A spoke engaging bar 15 is secured to the plate, said spoke engaging bar being formed with the concaved extension 16 the spoke being received by the concaved portion of said extension. The threaded terminals 11 of the bail extend through the threaded apertures 15, formed in the terminals of the spoke engaging bar, the bail supporting the bar on the plate 13.

It will be noted that when the nuts 14 are tightened, the bail 10 will be drawn into contact with the spoke, forcing the same within the concaved portion of the extension 16. The plate 13 is thus supported on the spoke, the plate being formed with an extension 17 which contacts with the spoke forming a contacting surface which is disposed at right angles to the spoke engaging bar 15. A plurality of lugs 18 have their off-set terminals 19 secured to the plate 13 adjacent its upper edge. These lugs or ears are provided with apertures 20 adjacent their terminals and apertures 21 intermediate their ends.

A substantially L-shaped latch member 22 is pivotally supported by the transverse pin 23 which extends within the apertures formed adjacent the terminals of the ears. This latch member 22 comprises a long arm 24, the terminal 25' of which is curved, and the short arm 26. One terminal of the trip member 25 is bifurcated, the bifurcations 28 of said terminal receiving the ears 18, screws 28' passing through the looped terminals 29 of the bifurcations pivotally supporting the trip member on the ears at a point adjacent the plate. The trip member is provided with the adjustable catch 31, a screw 32 passing through said catch, said screw passing through the slot 33 which is formed in the member 25, the screw being provided with the head 34 which is brought in binding contact with the body portion of the trip member 25, the catch in this manner being adjustable longitudinally of the trip member. The terminal 35 of the catch is disposed to extend between the ears 18, said terminal being beveled as at 36, and formed adjacent its beveled portion with the enlargement 37. A flat spring 38 is secured at 39 to the plate, said spring extending between the ears 18 being bent upon itself, its terminal being off-set and disposed to contact with the under face of the catch 35, the spring being received by the slot 40 formed in the trip member. Thus the spring is maintained in contact with the trip member, the slot forming a guide for the spring, maintaining it at all times in contact with the catch.

It will be noted that the spring will normally maintain the trip member 25 at right angles with the plate 13. The latch member 20 when the tire is inflated is moved on its pivot until its short arm 26 is received within the beveled portion 36 of the catch. The trip is then depressed, the lug or enlargement 37 supporting the short arm 26 against movement, the combined action of the spring 38 and said enlargement maintaining the latch member in set position. The member 20 is thus disposed at a point adjacent the tire, being out of contact with the tire when it is inflated. It will be seen that when the tire becomes deflated it will flatten out, its edge portion contacting with the latch member 20, bringing the short arm 26 of the latch member out of contact with the catch. The spring 38 then causes the trip member 25 to assume a position at right angles to the plate 13.

A vertically disposed supporting bracket 41 is secured to a convenient portion of the running gear, the present drawings showing the same as supported by the elliptical springs of the vehicle. A shaft 42 is supported for a rocking movement by the brackets 41, there being an arm 43 supported at both terminals of the shaft 42, said arm 43 being normally vertically disposed and in the path of the trip member 25 when the same has been moved to a position at right angles to the plate 13. A link 44 is arranged on the shaft 42, said link being connected by means of the wire 45 to the bell crank lever 46. This bell crank lever 46 is pivotally supported adjacent the front of the vehicle and is connected by means of the wire 47 with an arm 48 which when the bell crank is moved on its pivot will ring a bell 49. While the connections between the shaft 42 and the bell have been shown as formed of wire, it will be apparent that rods or levers may be substituted if it is found desirable.

When the trip member 25 is released by the latch member 20, it will contact as the wheel rotates with the adjacent arm 43, rocking the shaft 42 thus transmitting movement to the bell crank 46 by means of the link 44 and wire 45, sounding the alarm. The sounding of the alarm will be continued until the wheel ceases to rotate, the trip member being moved to assume its normal set position after the tire has been inflated.

The many advantages of a construction of this character will be clearly apparent as it will be seen that it provides means for advising the occupant of the vehicle that one of the tires is flattened and continues to sound the alarm as long as the vehicle is in motion.

It will be apparent that a mechanism other than that shown in the drawings may be used to actuate the alarm mechanism and that other forms of alarm mechanism may be substituted for that shown in the drawings.

In the form shown in Fig. 6 the latch member 46' is pivotally supported by the plate 47', said latch member being connected to said plate by the spring 48' one terminal of which is connected to the latch member at the point 49' and the other to the plate at the point 50. The trip 51 is pivotally supported by the ears 52 of the plate, a coil spring 53 normally extending the trip at right angles to the plate. The terminal 54 of the latch member 46' engages the trip at the point 55, maintaining the same in a position substantially parallel with the plate against the tension of the spring 53. It will be noted by this construction that when the tire is deflated the same will contact with the latch member 46', bringing it out of contact with the trip, which is then disposed at right angles to the plate by means of the spring 53. The many advantages of this construction will be clearly apparent, as it will be noted that the latch member and trip are both under spring tension and respond readily to the action of the tire.

It will be noted that this construction is such as may be easily and economically manufactured and that the various parts may be readily assembled.

Having described the invention, what I claim is:

1. A device of the class described comprising a plate supported by the spoke of a pneumatic tired wheel adjacent its rim, a yoke embracing the spoke, said yoke being formed with threaded terminals which extend through apertures in the plate, a bar supported on the plate by said yoke, said bar being formed with a concaved enlargement, the spoke being received between said yoke and said bar, ears supported by the plate on its face remote from said bar, a latch member pivotally supported between said ears, a trip one terminal of which is bifurcated, the bifurcations of said terminal being pivotally supported on the outer face of said ears, a member supported by said trip and adjustable longitudinally of the same, the terminal of said member extending between the bifurcations of the trip in the path of said latch member, a spring supported by the plate and disposed to extend between the bifurcations of the trip to contact with the adjustable member carried thereby, the said latch member being disposed to engage the adjustable member supported by the trip to maintain the trip substantially parallel with the plate, said trip when the latch member is released being disposed at right angles to the plate, and means actuated by the trip for sounding an alarm.

2. A device of the class described comprising a plate supported by the spoke of a pneumatic tired wheel adjacent its rim, said plate being provided with spaced arms, a substantially L-shaped latch member pivotally supported between said arms, a trip pivotally supported by the arms, and means interposed between the plate and trip for normally maintaining the latch member in a position where the tire may contact with the same when deflated.

3. A device of the class described comprising a plate supported by the spoke of a pneumatic tired wheel adjacent its rim, arms carried by the plate, a member formed with extensions disposed at right angles to each other, one of which is more extensive than the other, a member pivotally supported between said arms, a resilient latch arranged on said member, and resilient means interposed between said latch and the plate for maintaining the latch in contact with the less extensive arm of the first-mentioned member, whereby the more extensive arm of said member will be disposed where the tire may contact with the same when it is deflated.

In testimony whereof I affix my signature in presence of two witnesses.

MAX F. STADTMULLER. [L. S.]

Witnesses:
HENRY TROST,
HENRY L. WEISS.

---

Copies of this patent may be obtained for five cents each, by addressing the "Commissioner of Patents, Washington, D. C."